(12) United States Patent
Berman

(10) Patent No.: US 9,567,732 B2
(45) Date of Patent: Feb. 14, 2017

(54) METHODS, SYSTEMS AND APPARATUS FOR A WIND TURBINE AND WATER COLLECTION SYSTEM

(71) Applicant: David Jacob Berman, Newport Beach, CA (US)

(72) Inventor: David Jacob Berman, Newport Beach, CA (US)

(73) Assignee: David Berman, Newport Beach, CA (US)

( * ) Notice: Subject to any disclaimer, the term of this patent is extended or adjusted under 35 U.S.C. 154(b) by 15 days.

(21) Appl. No.: 14/843,743

(22) Filed: Sep. 2, 2015

(65) Prior Publication Data

US 2016/0040401 A1 Feb. 11, 2016

(51) Int. Cl.
  *F03D 9/00* (2016.01)
  *H02P 9/04* (2006.01)
  *E03B 3/28* (2006.01)
  *F03D 3/00* (2006.01)

(52) U.S. Cl.
  CPC ............... *E03B 3/28* (2013.01); *F03D 3/005* (2013.01); *F03D 9/00* (2013.01); *F03D 9/002* (2013.01); *Y02E 10/74* (2013.01)

(58) Field of Classification Search
  USPC .................................................. 290/44, 55
  See application file for complete search history.

(56) References Cited

U.S. PATENT DOCUMENTS

| 2009/0200151 A1* | 8/2009 | Whisson | C02F 1/047 202/185.1 |
| 2010/0207394 A1* | 8/2010 | Leung | E02B 9/00 290/54 |

* cited by examiner

*Primary Examiner* — Pedro J Cuevas

(57) ABSTRACT

The present invention is a device that can obtain fresh water from the moisture air and generate electricity in the process. The water collecting device comprises a vertical shaft, windmill elements for producing rotational force from wind, a vertical shaft, a water collecting tank secured at the bottom of this rotating structure, a small holed mesh with U shaped collecting ducts in the windmill structure and a generator coupled to the shaft. When the windmill structure rotates from the wind, moisture from the air adhere to the mesh and then are channeled to the water-collecting vessel through channels along the windmill frame. Additionally a generator coupled to the windmill frame produces electricity.

11 Claims, 5 Drawing Sheets

METHODS, SYSTEMS AND APPARATUS FOR A WIND TURBINE AND WATER COLLECTION SYSTEM

FIELD OF THE INVENTION

The disclosures and embodiments of the invention relate to water collection from air and energy production from wind from a single apparatus.

BACKGROUND OF THE INVENTION

The state of California has suffered from and continues to suffer from a drought, which causes water resources to run scarce and water to be rationed. California faces frequent and severe droughts. It's not usual for it's governor to declare a drought State of Emergency and directed state officials to take all necessary actions to prepare for water shortages. Californian's have been water rationed as a result of water shortages and must conserve their water. As a result of these water rations, private gardens and other green landscapes are directed cut down on their watering and many government owned buildings do not have plants around the property (schools, courthouses, etc.). Reservoirs frequently start to run dry as a result of the lack of water causing many areas to dry up. The ongoing drought in California is likely to have a major impact on the State's agricultural production. Long-term moisture deficits across most of the State remain at near-record levels. Because California is a major producer in the fruit, vegetable, tree nut, and dairy sectors, the drought has potential implications for U.S. supplies and prices of affected products this year and beyond. A new scientific and economic report commissioned by California's state government warns that the ongoing drought crisis will cost billions in lost farm revenue and thousands of jobs. California's drought is now in its third year and is expected to worsen, thanks to record high temperatures and a low snowpack in the state's mountains. California is a very big state comprising a large coastline, several mountain ranges and even deserts. Many of California's climates contain significant moisture content in the air. With California's drought conditions, what's needed is a way to take advantage of it's air moisture content to harvest water from air.

BRIEF SUMMARY OF THE INVENTION

Systems, methods and apparatus are disclosed for obtaining fresh water from the moisture in air and generating electricity in the process. The present invention comprises a windmill attached to a base. The windmill comprising a windmill mesh, frame and a base shaft. When air strikes the windmill it creates rotational force and turns the windmill. The windmill mesh traps moisture that moves along the mesh to the outer windmill frame from the centrifugal force when the windmill is rotating. The windmill frame contains a channel for the water to collect. After a certain amount of water collects, gravity forces the water down to the frame base where a hollow shaft directs the water into a collection vessel in the base. The water in the collection vessel further migrates to an external collection vessel, again the movement is from gravity acting on the weight of the water. A gear is attached to the shaft that attaches to the windmill frame and is coupled to the base. The gear rotates as the windmill rotates. The gear is coupled to another gear that is coupled to an electrical generator that produces electricity when the windmill and the shaft rotate.

BRIEF DESCRIPTION OF THE DRAWINGS

The drawings illustrate only exemplary embodiments of the invention and therefore do not limit its scope because the inventive concepts lend themselves to other equally effective embodiments.

DETAILED DESCRIPTION OF THE INVENTION

Figure 1:
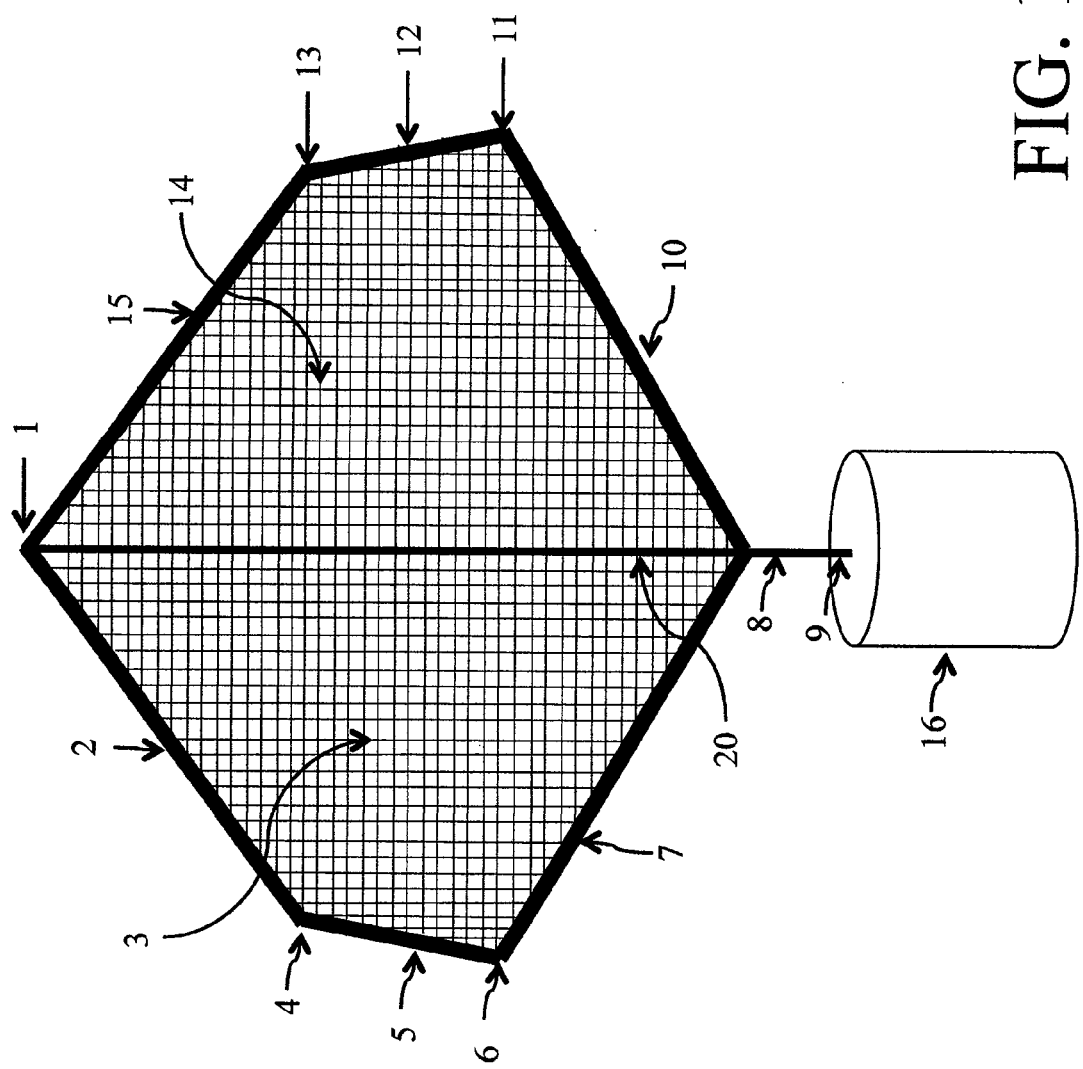
FIG. 1 is a diagram illustrating the invention including the windmill, windmill mesh, rotor and base structural components.

The drawings illustrate only exemplary embodiments of the invention and therefore do not limit its scope because the inventive concepts lend themselves to other equally effective embodiments. FIG. 1 shows the invention including the windmill, windmill mesh, rotor and base structural components. The invention may comprise one or more of the following: mesh screen 3, 14 attached to a frame 1, 2, 4, 5, 6, 7, 10, 11, 12, 13, 15 and a shaft 8, 20. The shaft 8, 20 further coupled with the base 16 through a hole 9 which the shaft 8 rotates. The windmill frame optionally comprises six sides. The sides 2, 4, 5, and 5, 6, 7 and 12, 13, 15 and 10, 11, 12 come together in an angle greater than 90 degrees. This prevents the water from moving to the top 1 of the windmill frame and helps the gravity act on the water to move it down to the bottom of the windmill frame 8. Although the drawing and description of the windmill frame show six sides, the windmill frame can be comprised of three or more sides.

Figure 2:
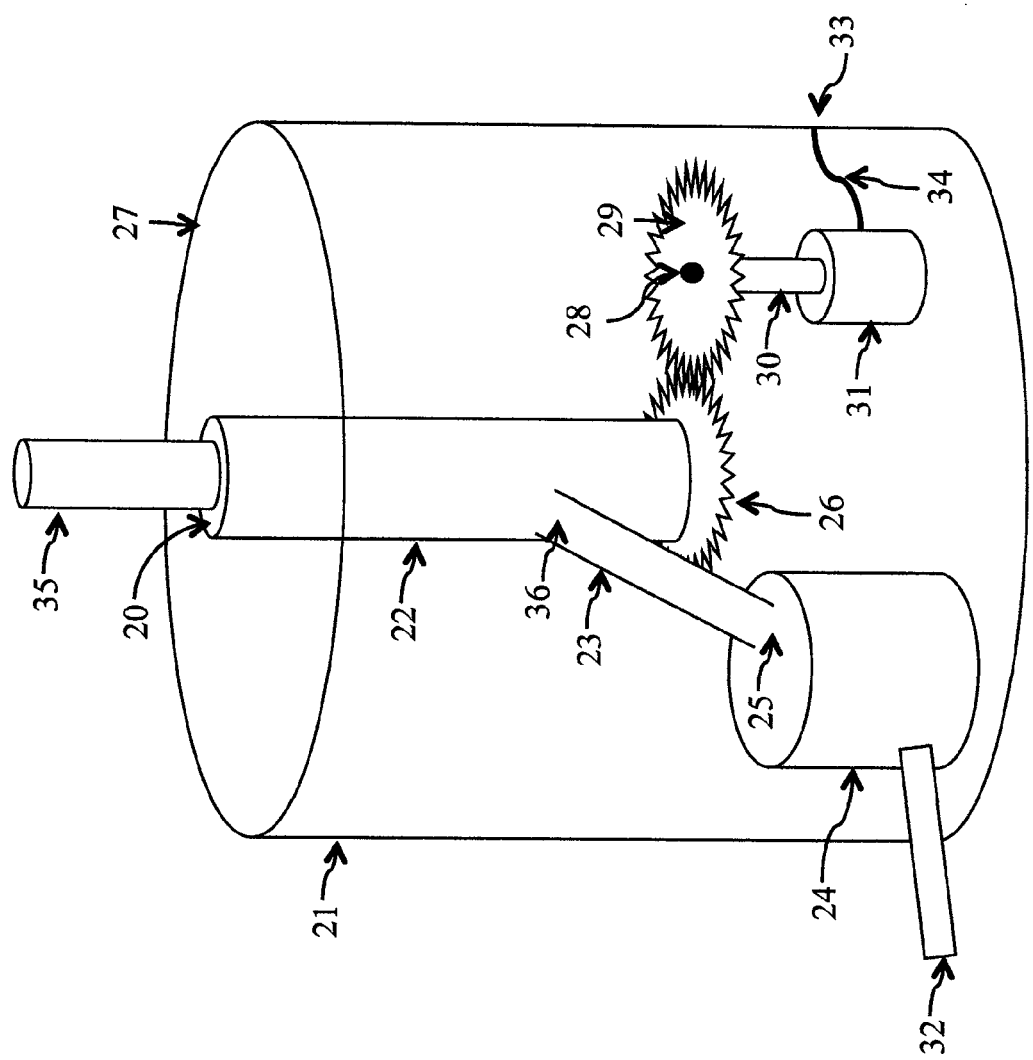
FIG. 2 is a diagram illustrating the base assembly of the invention.

FIG. 2 shows a detail of the base 21, 27 (also FIG. 1, 16). The base shown 21, 27 is cylindrical but can be any shape. The shaft 35 (also seen in FIG. 1, 8) attaches to the windmill frame, FIG. 1, 1, 2, 4, 5, 6, 7, 8, 10, 11, 12, 13, 15, 20 and rotates from the force when wind hits the windmill mesh, FIG. 1, 3, 14. The shaft 35 fits inside an outer tube 20 and to a gear 26. As the shaft turns the gear turns. Water from the frame travels inside the shaft 35 to a level within the shaft 36. The shaft contains holes near the bottom (see FIG. 3, 51) that allow the water collected from the windmill to collect in the outer tube 22. When water reaches the diverter tube top level 36 in the outer tube 22, the water will then spill over into the diverter tube 23, 36. The diverter tube 23, 25 is coupled to and diverts the water into a collection vessel 24. The collection vessel 24 is coupled to and external delivery pipe 32 which can be connected to one or more of the following: an external plumbing network, a spout or faucet to fill up water containers, an external collection vessel. The shaft 26 is connected to a gear 16 which itself is connected to a second gear 29. The second gear 29 is preferably connected 28 by a shaft 30 to an electrical generator 31. The electrical generator produces electricity when the windmill rotates, which rotates the gear 26 attached to the shaft 35, which is coupled to a second gear 29 which turns the shaft 30 of the electrical generator 31. The electricity generated from the electrical generator 31 is coupled 34 to base electrical connector 33.

Figure 3:
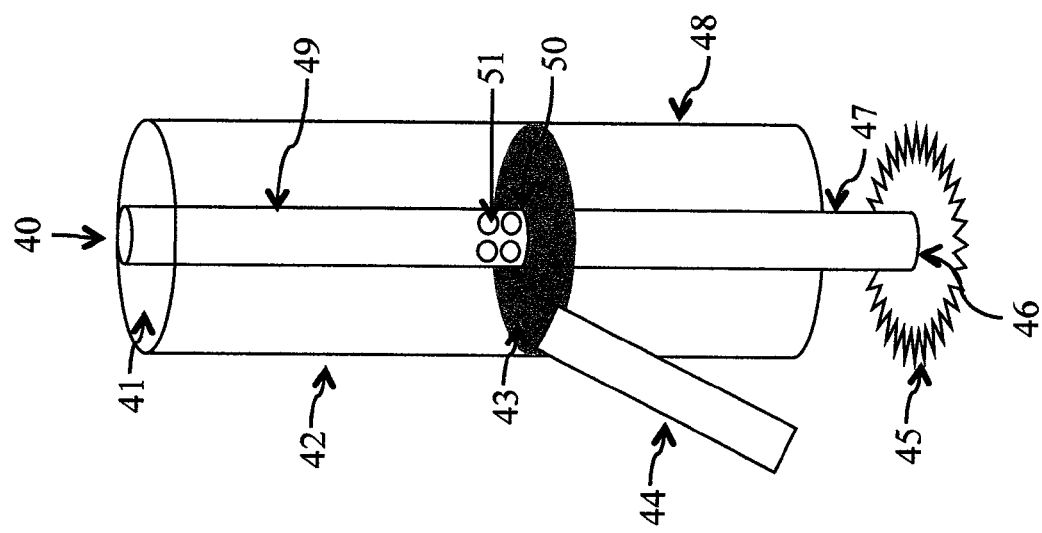
FIG. 3 is a diagram illustrating the water collection vessel in the base in more detail.

FIG. 3 is a diagram illustrating the water collection vessel in the base in more detail. The base outer tube 41, 42, 48, see also FIG. 2, 20, 22 is stationary and collects water from holes in the shaft 40 47 49, see also FIG. 2, 35. The shaft 40, 47, 49 rotates when the windmill frame, see FIG. 1, 1, 2, 4, 5, 6, 7, 8, 10, 11, 12, 13, 15 rotates. The inside of the shaft is blocked at 50, so the water level will rise within the shaft 40, 47, 49. The shaft 40, 47, 49 contains holes 51 in which the water moving down the shaft will flow out of The water collects in the space between the inner shaft 40, 47, 49 and the outer shaft 41, 42, 48. The water will collect starting at a outer and inner watertight ring 43, 50 until the level is above the diverter tube 44. When the water level rises above the diverter tube 44, it will spill over into the diverter tube. The shaft 40, 47, 49 is also coupled 46 to a gear 45, which rotates when the shaft rotates.

Figure 4:
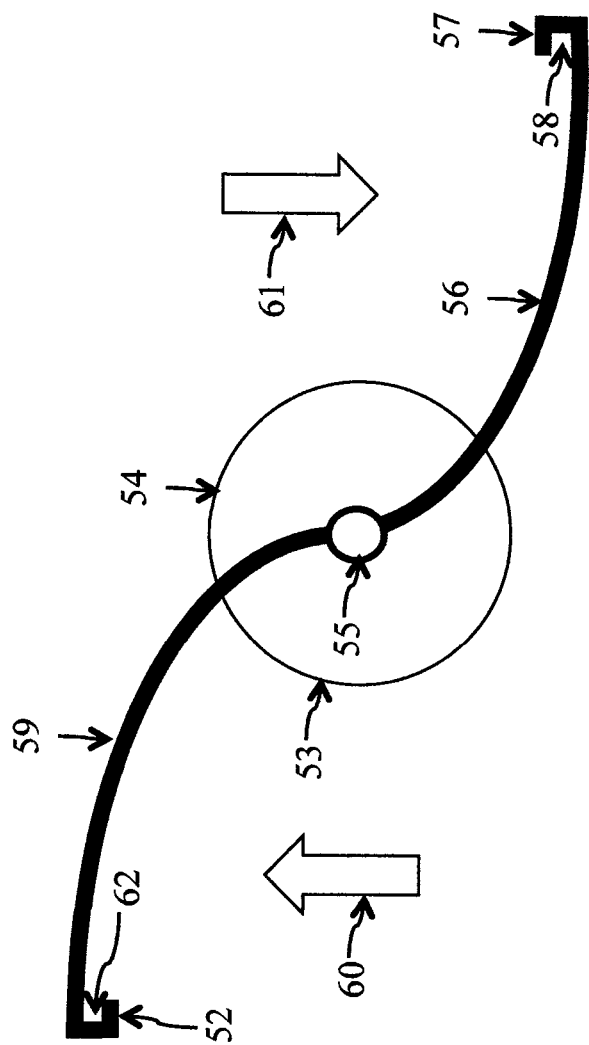
FIG. 4 is a diagram showing the top down view of the invention.

FIG. 4 is a diagram showing the top down view of the invention. The following structures are shown from a top view: the windmill shaft 55, the windmill frame 52, 56, 57, 58, 59, 62, the collection vessel 53, 54 and the bends in the windmill frame 52, 62, 57, 58. The arrows 60, 61 indicate the wind direction. When the wind hits the frame 52, 56, 57, 58, 59, 62 in the direction of the arrows 60, 61, the windmill rotates in a clockwise manner. Moisture in the air gets trapped in the mesh of the frame. Centrifugal force will move the water from the windmill screen to the outer windmill frame 52, 62, 57, 58. The bend in the outer frame 52, 62, 57, 58 traps the water so it won't spill out of the frame. The more water that is trapped, the heavier it gets. When the weight of the water droplets reaches a certain weight that is greater than the centrifugal force caused by the rotation of the windmill frame, the water will travel down the outside of the window frame in the water channel 62, 58.

Figure 5:
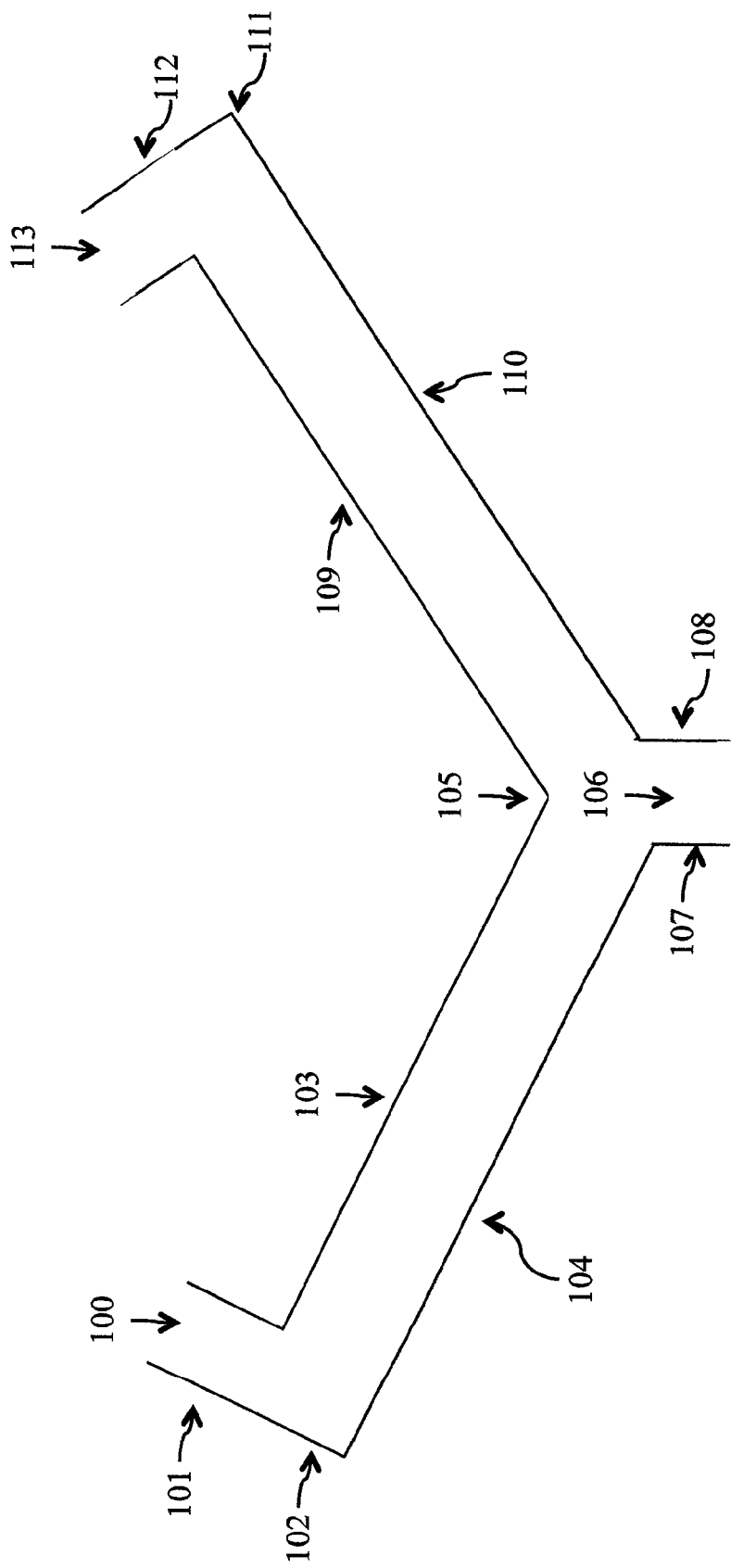
FIG. 5 is a diagram of a more detailed view of the bottom of the windmill frame showing the water channels.

FIG. 5 is a diagram of a more detailed view of the bottom of the windmill frame showing the water channels. The bottom of the windmill frame is shown 101, 102, 103, 104, 105, 107, 108, 109, 110, 111, 112. Note the windmill mesh screen is not shown. Water collects in the outside of the windmill frame from centrifugal force and into the channel 100, 106, 113. Gravity forces the water into the base 106 when enough water has collected. The angles in the windmill frame 101, 102, 104 and 112, 111, 110 channel the water down the windmill frame 103, 104 and 109, 110. The angles are sharp enough, greater than 90 degrees that the water does not migrate up the windmill frame.

Although the foregoing invention has been described in some detail by way of illustration and example for purposes of clarity and understanding, it may be readily apparent to those of ordinary skill in the art in light of the teachings of this invention that certain changes and modifications may be made thereto without departing from the spirit or scope of the appended claims.

All publications and patents cited in this specification are herein incorporated by reference as if each individual publication or patent were specifically and individually indicated to be incorporated by reference in their entirety.

I claim:

1. An apparatus for collecting water from the moisture in air and electricity from wind, the apparatus comprising:
    a windmill mesh to provide resistance to the wind a windmill mesh frame containing the mesh, comprising:
    at least six sides, the sides comprising a water channel to collect the water as it flows into the frame due to centrifugal force from the rotating windmill
    a hollow shaft, the shaft connected to the windmill mesh frame, the hollow shaft containing holes to allow water to migrate out of the hollow shaft,
    a base, the base comprising:
        a water collection area between the windmill frame hollow shaft and the inner wall of the base,
        a diverter tube that diverts water from the outer tube to a water collection tank,
        an electrical generator,
        two gears, the first coupled to the hollow shaft, the second coupled to the electrical generator
    whereby when moisture in wind hits the windmill mesh it collects on the mesh and migrates to the windmill frame by centrifugal force, the water traveling from the outside of the windmill frame to the bottom of the frame by gravity, the water collecting in the hollow shaft at the bottom of the windmill where it travels to an outer tube and is then diverted to a collection tank.

2. The apparatus of claim 1 further including an electrical generator generating electricity from the rotating gear on the hollow shaft.

3. The apparatus of claim 1 further including an electrical connector coupled to the electrical generator.

4. The claim in 1 further including the windmill frame vertices, or where the sides connect, comprising angles of greater than 90 degrees between four of the six vertices.

5. A method for trapping water from moisture in the air and generating electricity from air, the method comprising:
    moist air blowing against a windmill with a mesh,
    the mesh trapping the moisture in the air,
    the moisture traveling from the windmill mesh to the windmill frame from the centrifugal force caused by the rotation of the windmill frame,
    the moisture forming water droplets in the windmill frame,
    the water droplets moving down the windmill frame due to gravity,
    collecting the water droplets in a collection tube in the base of the windmill,
    diverting the water into a diverter tube at the base of the windmill when the water level reaches a certain height in the collection tube,
    the windmill hollow shaft coupled to an electrical generator through gears,
    whereby water is collected in a collection vessel and the windmill shaft is used to turn a gear connected to an electrical generator to produce electricity.

6. The method of claim in 5 further including an electrical connector where the electrical generator is connected to an electrical appliance.

7. The method of claim 5 further including the water channeled from the outer windmill frame through the bottom of the base hollow shaft through gravity, then the water flows out of the hollow shaft into an outer collection vessel through holes in the hollow shaft.

8. A system for generating water and electricity from moisture in wind, the system comprising:
    a windmill frame, the windmill frame comprising:
        a windmill frame with six sides, four of the six sides connected through an angle greater than ninety degrees,
        a mesh, the mesh stretched between the windmill frame,
        a water channel, the water channel forming part of the windmill frame,
        a hollow shaft, the hollow shaft running down the center of the windmill, a base, the based comprising:
- a base enclosure,
- an outer vessel within the base enclosure,
- an inner vessel within the outer vessel,
- a diverter tube coupled to both the inner and outer vessel to divert water from the inner vessel to the outer vessel,
- an electrical generator,
- two or more gears, the gears coupling the windmill hollow shaft to the electrical generator, the based coupled with the windmill frame and mesh through the windmill hollow shaft, whereby the windmill frame rotates from wind hitting it, moisture from the air is caught on the mesh, moves to the windmill frame through centrifugal force, then moves down the windmill frame through gravity, collects in the collection vessels and turns one or more gears coupled to an electrical generator.

9. The system in claim 8 further including an opening in the base to collect the water in an external vessel, pipe or faucet.

10. The system in claim 8 further including a connection between the electrical generator and an appliance that produces one or more of the following: light and cooling.

11. The system in claim 8 further including the shape of the base being one or more of the following: round, square, rectangle, oblong and polygon.

* * * * *